United States Patent
Wang et al.

(10) Patent No.: US 7,580,445 B2
(45) Date of Patent: Aug. 25, 2009

(54) NONLINEAR PRECODING IN CODE-DIVISION MULTIPLE ACCESS COMMUNICATION SYSTEM

(75) Inventors: Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 495 days.

(21) Appl. No.: 11/259,442

(22) Filed: Oct. 26, 2005

(65) Prior Publication Data

US 2007/0041428 A1  Feb. 22, 2007

Related U.S. Application Data

(60) Provisional application No. 60/710,060, filed on Aug. 22, 2005.

(51) Int. Cl.
*H04B 1/69* (2006.01)
*H04L 27/28* (2006.01)

(52) U.S. Cl. .................................. 375/146; 375/260
(58) Field of Classification Search ............. 375/146, 375/233, 260, 295, 296, 300; 370/208, 335, 370/342
See application file for complete search history.

(56) References Cited

U.S. PATENT DOCUMENTS

| 5,249,200 | A | * | 9/1993 | Chen et al. | 375/285 |
| 6,324,220 | B1 | * | 11/2001 | Sellars | 375/296 |
| 6,597,746 | B1 | * | 7/2003 | Amrany et al. | 375/296 |
| 7,133,465 | B2 | * | 11/2006 | McLaughlin | 375/296 |
| 7,212,582 | B2 | * | 5/2007 | Zhang | 375/296 |

OTHER PUBLICATIONS

Harashima, H., et al. "Matched-Transmission Technique for Channels With Intersymbol Interference." IEEE Transactions on Communications, vol. Com-20, No. 4, (Aug. 1972) pp. 774-780.
Tomilson, M., "New Automatic Equalisor Employing Modulo Arithmetic:." IEEE Electron. Lett. (Feb. 1971) pp. 138-139.
"Precoding in Multiantenna and Multiuser Communications" Windpassinger, C., et al. IEEE Transactions on Wireless Communications, vol. 3, No. 4, (Jul. 2004) pp. 1305-1316.

* cited by examiner

*Primary Examiner*—Young T. Tse
(74) *Attorney, Agent, or Firm*—Joseph J. Kolodka; James Bitetto

(57) ABSTRACT

A precoding technique is herein disclosed for a spread-spectrum transmission system which advantageously addresses intersymbol interference along with multiuser and interchip interference.

20 Claims, 7 Drawing Sheets

```
INPUT: row vectors $h_1^T, ..., h_K^T$ in $H$
$P = 0_{K \times K}$
$k_1 = \arg\min_{i \leq K}\{\|h_i\|\}$;
$\hat{h}_1 = h_{k_1}/\|h_{k_1}\|$; $P(1, k_1) = 1$; $\Theta_1 = \{k_1\}$;
FOR $i = 2 : K$
    FOR EVERY $j \in \{\{1, ..., K\} \setminus \Theta_{i-1}\}$
        $u_j = h_j - \sum_{p=1}^{i-1} \mu_{p,j} \hat{h}_p$;
    END FOR
    $k_i = \arg\min_j\{\|u_j\|\}$;
    $\hat{h}_i = u_{k_i}/\|u_{k_i}\|$; $\Theta_i = \{\Theta_{i-1}\} \cup \{k_i\}$;
    $P(i, k_i) = 1$;
END FOR
OUTPUT: matrix $P$ and LQ decomposition of $PH$.
```

FIG. 3

NONLINEAR PRECODING IN CODE-DIVISION MULTIPLE ACCESS COMMUNICATION SYSTEM

CROSS-REFERENCE TO RELATED APPLICATIONS

This application claims the benefit of and is a nonprovisional of U.S. Provisional Application No. 60/710,060, entitled "NONLINEAR PRECODING FOR TD-SCDMA," filed on Aug. 22, 2005, the contents of which are incorporated herein by reference.

BACKGROUND OF INVENTION

The invention relates generally to code-division multiple access systems and, in particular, to precoding techniques for reducing inteference in such systems.

A major problem for systems using code-division multiple access (CDMA) is that multipath fading can introduce multiuser interference (MUI) and intersymbol inteference (ISI). One technique to minimize the interference in direct sequence CDMA systems is referred to as "multiuser detection" (MUD), in which multiple transmitters (e.g., mobile units) send independent data streams to a single receiver (e.g., a base station) which performs complex signal processing algorithms to remove the MUI and ISI. Unfortunately, applying conventional multiuser detection to the downlink transmission rather than the uplink transmission faces a number of significant hurdles. For example, linear MUD techniques not only increase the complexity of the downlink receivers, they also require that the mobile units know the spreading sequence of the rest of the users.

One approach to addressing these issues is to transfer the decoding complexity of the receiver to the transmitter, a technique generally referred to as "precoding." Transmitter precoding is an attractive solution for systems employing time-division multiplexing, where uplink and downlink channels are reciprocal to each other. A variety of linear precoding techniques have been proposed which obtain a good tradeoff between complexity and performance in a system with interchip inteference but without intersymbol interference. Intersymbol interference can be ignored through the introduction of guard intervals or because the spreading gain is much longer than the length of the multipath channel. In a system with intersymbol inteference, however, the complexity of such prior art systems becomes intractable since the matrix filter sizes are proportional to the frame length multiplied by the number of users (i.e., block processing).

SUMMARY OF INVENTION

A precoding technique is herein disclosed for a spread-spectrum transmission system which advantageously addresses intersymbol interference along with multiuser and interchip interference. The precoder design uses a feedback filter and a feedforward filter to address multiuser and interchip interference while another feedback filter is applied to a previously-precoded vector and the result subtracted from the incoming symbol vector to cancel intersymbol interference. The precoder design can be implemented using bit-wise operations or chip-wise operations. The chip-wise precoder design combines the preceding operation with the spreading operation and offers potential performance improvement compared with the bit-wise precoder. A power loading approach is also disclosed which further optimizes the system performance. The precoder design is advantageously considerably less complex than block-wise linear precoders. The disclosed precoding technique also is particularly advantageous when utilized with systems employing time-division multiplexing of the uplink and downlink channels.

These and other advantages of the invention will be apparent to those of ordinary skill in the art by reference to the following detailed description and the accompanying drawings.

BRIEF DESCRIPTION OF DRAWINGS

FIG. 3 is pseudo-code illustrating a greedy approach to generating the permutation matrix.

DETAILED DESCRIPTION

Figure 1:
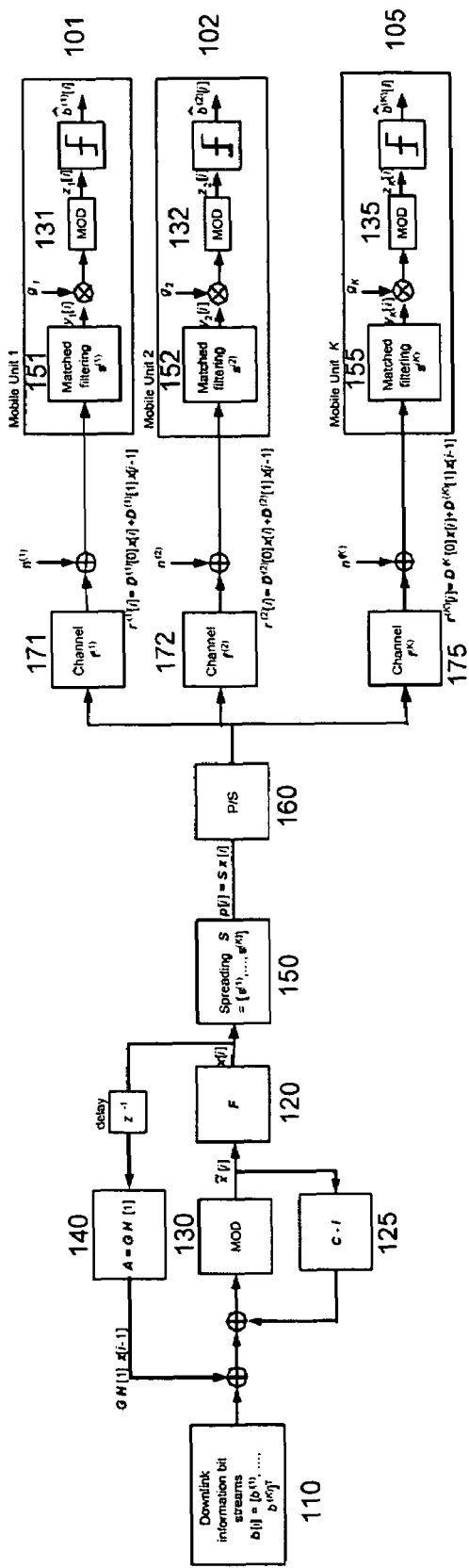
FIG. 1 illustrates a communication transmission system using a preceding structure arranged in accordance with an embodiment of the invention.

FIG. 1 illustrates a communication transmission system using a preceding structure arranged in accordance with an embodiment of the invention. The system is herein assumed to be without limitation a discrete-time synchronous code-division multiple access (CDMA) system providing downlink transmission over multipath channels to K receivers 101, 102, . . . 105.

As depicted in FIG. 1, the transmitter receives a downlink information stream 110 denoted by $b[i]=[b_1[i], \ldots, b_K[i]]^T$, where $b_\kappa[i]$ is an information symbol selected from a finite constellation set A of the $\kappa$-th user transmitted during the i-th symbol interval. As further described in detail below, the transmitter performs a symbol by symbol preceding operation which results in a K×1 precoded symbol vector $\chi[i]=\psi(b[i], \ldots, b[i-v+1])$, based on $v$ information symbol vectors. The precoded symbol vector is transformed into spread-spectrum signals at 150, where N denotes the spreading factor and $s_\kappa=[s_{\kappa,1}, \ldots, s_{\kappa,N}]^T$ represents the spreading waveform of the $\kappa$-th user. The signal transmitted during the i-th symbol interval can be written as $p[i]=S\chi[i]$, where $S=[s_1, s_2, \ldots, s_K]$.

The multipath channels between the transmitter and the receivers 101, 102, . . . 105 are modeled as shown in FIG. 1 and as described below. The transmitted signal vector p[i] is depicted as passing through a parallel-to-serial converter 160 and subjected to different complex fading gains 171, 172, . . . 175 depending on the path to the receivers 101, 102, . . . 105. The path delays are assumed to be integral multiples of the chip interval. Denote the multipath channel seen by the $\kappa$-th user as $f_\kappa=[f_{\kappa,1}, \ldots, f_{\kappa,2}, \ldots, f_{\kappa,L}]^T$, where L is the number of resolvable paths and $f_{\kappa,l}$ is the complex fading gain corresponding to the l-th path of the $\kappa$-th user. It is assumed that $L \leq N$ so that the delay spread is at most one symbol interval. Denote $r_\kappa[i]$ as the N×1 received signal vector by the $\kappa$-th user during the i-th symbol interval (i.e., N consecutive chip intervals). Then (1)     $r_\kappa[i] = D_\kappa S\chi[i] + \overline{D}_\kappa S\chi[i-1] + n_\kappa[i]$, where $n_\kappa[i] \sim N_c(0, \sigma_n^2 I_N)$ is the complex white Gaussian noise vector at the κ-th receiver, and $$D_k = \begin{bmatrix} f_{k,1} & 0 & & \cdots & 0 \\ f_{k,2} & f_{k,1} & 0 & & \vdots \\ \vdots & & \ddots & \ddots & 0 \\ 0 & \cdots & f_{k,L} & \cdots & f_{k,1} \end{bmatrix}_{N \times N}, \quad (2)$$

and $$\overline{D}_k = \begin{bmatrix} 0 & \cdots & f_{k,L} & \cdots & f_{k,2} \\ 0 & \cdots & \ddots & \ddots & \vdots \\ \vdots & \ddots & \ddots & 0 & f_{k,L} \\ 0 & \cdots & & \cdots & 0 \end{bmatrix}_{N \times N}.$$

The K receivers 101, 102, . . . 105 then proceed to process the multipath signals. Each receiver 101, 102, . . . 105 has a matched-filter 151, 152, . . . 155. At the κ-th receiver, the matched-filter is applied to the received signal $r_\kappa[i]$ with this user's signature waveform, i.e., $y_\kappa[i] = s_\kappa^H r_\kappa[i]$. By stacking the matched-filter output from all users into a single vector, the output vector can be represented by $$\underbrace{\begin{bmatrix} s_1^H r_1[i] \\ s_2^H r_2[i] \\ \vdots \\ s_K^H r_K[i] \end{bmatrix}}_{y[i]} = \underbrace{\begin{bmatrix} s_1^H D_1 S \\ s_2^H D_2 S \\ \vdots \\ s_K^H D_K S \end{bmatrix}}_{H} x[i] + \underbrace{\begin{bmatrix} s_1^H \overline{D}_1 S \\ s_2^H \overline{D}_2 S \\ \vdots \\ s_K^H \overline{D}_K S \end{bmatrix}}_{\overline{H}} x[i-1] + \underbrace{\begin{bmatrix} s_1^H n_1[i] \\ s_2^H n_2[i] \\ \vdots \\ s_K^H n_K[i] \end{bmatrix}}_{v[i]}. \quad (3)$$

where H and $\overline{H}$ are K×K matrices. Accordingly, the precoder design should preferably be selected so as to generate an output vector y[i] that is as close as possible to the transmitted data vector b[i].

The different elements of the precoder design depicted in FIG. 1 can be described as follows. First, a feedforward (FF) filter matrix 120, represented by the matrix F, and a feedback (FB) filter matrix 125, represented by (C-I), are utilized to remove multiuser interference and interchip inteference. This design is based on the known technique of Thomlinson-Harashima precoding. See, e.g., H. Harashima and H. Miyakawa, "Matched Transmission Technique for Channels with Intersymbol Interference," IEEE Trans. Commun., 20: 774-80 (1972); M. Tomlinson, "New Automatic Equaliser Employing Modulo Arithmetic," IEEE Electron. Lett., pp. 138-39 (Mar. 1971); C. Windpassinger et al., "Precoding in Multi-Antenna and Multi-User Communications," IEEE Trans. Wireless Commun. (Mar. 2004). Denote the LQ factorization of the matrix H as $H = WF^H$, where F is unitary and W is lower triangular. The purpose of the feedforward matrix F is to convert the interference into a causal form without increasing the transmit power. This permits the cancellation of the causal interference using the feedback filter matrix (C-I). For the interference cancellation to be possible, C needs to be monic lower triangular. To obtain C, decompose $W = G^{-1}C$ where G is the diagonal matrix that makes C monic, i.e., $G = \text{diag}(\omega_{1,1}^{-1}, \ldots, \omega_{K,K}^{-1})$ where $\omega_{i,i}$ denotes the i-th diagonal element in W. Denote $\overline{\chi}$ as the output of the feedback filter. Then we have $\overline{\chi}[i] = b[i] - (C-I)\overline{\chi}[i]$, and consequently, the equivalent feedback operation is $\overline{\chi}[i] = C^{-1}b[i]$. Thus, the input data symbols b[i] are first passed through the feedback filter $C^{-1}$ and then through the feedforward filter F, i.e., $\chi[i] = FC^{-1}b[i]$, followed by spreading as depicted in FIG. 1.

Due to the lower triangular structure of the matrix C, the output of the feedback filter $\overline{\chi}_\kappa$, κ=1, . . . , K, is successively generated from the input data symbols $b_\kappa[i] \in A$, and the previous output of the feedback filter, $\overline{\chi}_l[i]$, l=1, . . . , κ-1, as $\overline{\chi}_\kappa[i] = b_\kappa[i] - \sum_{l=1}^{\kappa-1} c_{\kappa,l} \overline{\chi}_l[i]$, κ=1, . . . , K. To prevent an increase in transmit power, a modulo operation with respect to A is applied, as depicted by 130 in FIG. 1. For example, for M-QAM constellations, the modulo operation corresponds to adding integer multiples of $2\sqrt{M}$ to the real and the imaginary parts of $b_\kappa[i]$, so that the resulting output signal falls in the range of A. Then the output of the feedback filter becomes $$\tilde{x}_k[i] = b_k[i] + d_k[i] - \sum_{\ell=1}^{k-1} c_{k,\ell} \tilde{x}_\ell[i], \quad (4)$$

$$k = 1, \ldots, K,$$

where $d_\kappa[i] \in \{2\sqrt{M}(d_I + jd_Q) | d_I, d_Q \in \mathbb{Z}\}$. That is, instead of feeding back $b_\kappa[i]$, the symbols $v_{\kappa[i]} = b_\kappa[i] + d_\kappa[i]$ are passed through $C^{-1}$.

In order to cancel the effect, the receivers 101, 102, . . . 105 apply the same modulo operation at 131, 132, . . . 135. At the k-th user's receiver, a matched-filter $s_\kappa$, a scalar operation $g_\kappa = G[\kappa, \kappa] = \omega_{\kappa,\kappa}^{-1}$ and the same modulo operation as applied at the transmitter are applied to the received signal $r_\kappa[i]$. Therefore, without considering the modulo operation, the end-to-end operation for all K users is given by $$z[i] = G(HFC^{-1}b[i] + v[i]) = b[i] + Gv[i]. \quad (5)$$

and the k-th user makes a decision on $b_\kappa[i]$ based on the decision statistic $z_\kappa[i]$. Note that the scalar gains $g_\kappa$, κ=1, . . . , K, can be either estimated at the receiver (automatic gain control) or broadcast by the transmitter/base station.

Finally, consider the intersymbol interference caused by the term $\overline{H}\chi[i-1]$ present in equation (3). As depicted in FIG. 1, another feedback filter 140 is employed to cancel the intersymbol interference term $\overline{H}\chi[i-1]$ with the decomposition $H = G^{-1}CF^H$. The receiver will observe an ISI term, $\overline{H}\chi[i-1]$ caused by the previous symbol. Then, a second feedback cancellation can be used to cancel the interference caused by the previous symbol $\chi[i-1]$. Suppose that the previously precoded symbol $\chi[i-1]$ is first filtered by a filter A and then substracted from the current data symbol b[i], as depicted in FIG. 1. To find the matrix A that minimizes the mean-square error (MSE) consider the error signal at the decision device $$e[i] = \underbrace{(GHFC^{-1}(b[i] - Ax[i-1]) + Gv[i] + G\overline{H}x[i-1])}_{z[i]} - b[i]. \quad (6)$$

By the orthogonality principle, $E\{ez^H\} = 0$, which leads to $(G\overline{H} - GHFC^{-1}A) = 0$, i.e., $A = G\overline{H}$. Note that the matrix A is the same for the ZF (zero forcing) and MMSE (minimum mean-squared error) optimization criterion.

Hence, the end-to-end cascade of operations performed in FIG. 1 can be represented by $$z[i] = \underbrace{G}_{rx}\left(\underbrace{G^{-1}CF^H}_{channel}\left(\underbrace{F}_{FF\,cancel,FB}\underbrace{C^{-1}}_{cancel,ISI}\left(b[i] - G\overline{H}x[i-1]\right)\right) + \underbrace{\overline{H}x[i-1]}_{ISI\,channel} + v[i]\right), \quad (7)$$

where the modulo operation is not included for clarity.

Figure 2:
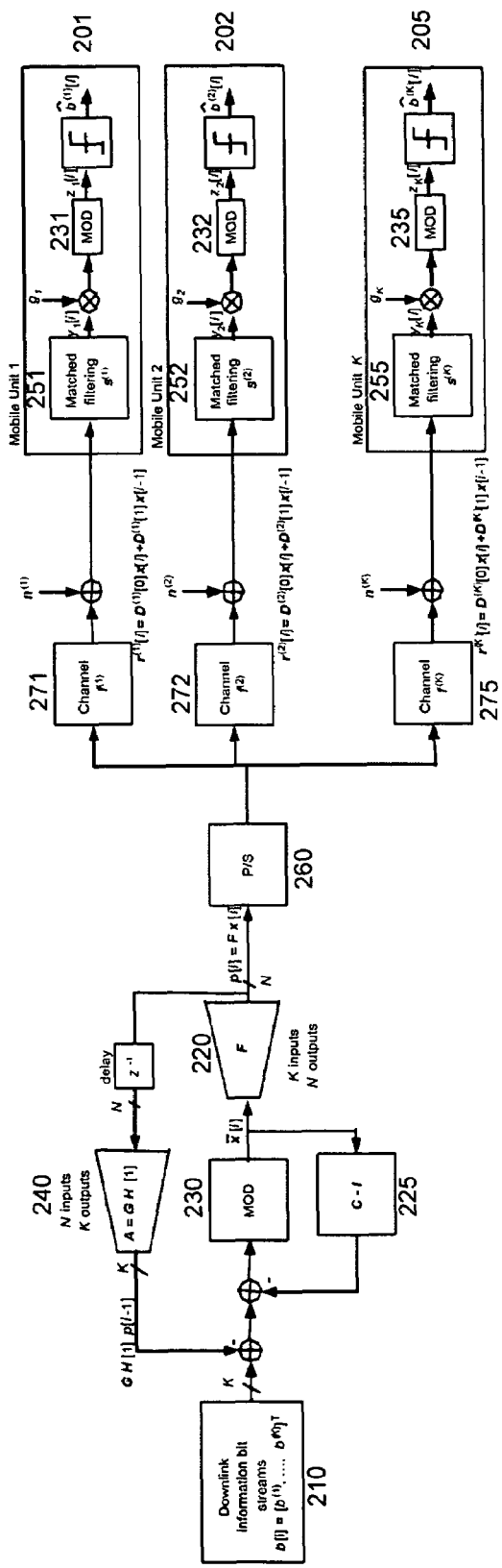
FIG. 2 illustrates a communication transmission system using a preceding structure arranged in accordance with another embodiment of the invention.

FIG. 2 depicts an alternative chip-wise precoding design that includes the spreading operation as part of the preceding operation. The precoder takes as input the K×1 symbol vectors b[i] and converts them into vectors p[i] of size N×1 ready to be transmitted at chip rate. At the k-th user's receiver, the N×1 received signal vector corresponding to p[i] is given by $$r_\kappa[i] = D_\kappa p[i] + \overline{D}_\kappa p[i-1] + n_\kappa[i]. \quad (8)$$

At each receiver κ, the matched-filter $s_\kappa$ is applied to $r_\kappa[i]$. By stacking the outputs of all κ matched-filters we obtain $$\underbrace{\begin{bmatrix} s_1^H r_1[i] \\ s_2^H r_2[i] \\ \vdots \\ s_K^H r_K[i] \end{bmatrix}}_{y[i]} = \underbrace{\begin{bmatrix} s_1^H D_1 \\ s_2^H D_2 \\ \vdots \\ s_K^H D_K \end{bmatrix}}_{H} p[i] + \underbrace{\begin{bmatrix} s_1^H \overline{D}_1 \\ s_2^H \overline{D}_2 \\ \vdots \\ s_K^H \overline{D}_K \end{bmatrix}}_{\overline{H}} p[i-1] + \underbrace{\begin{bmatrix} s_1^H n_1[i] \\ s_2^H n_2[i] \\ \vdots \\ s_K^H n_K[i] \end{bmatrix}}_{v[i]}. \quad (9)$$

Note that in contrast with the FIG. 1 embodiment described above, here H is not a square matrix but has dimension K×N with N≥K. Similarly as before, to apply the precoding we perform the LQ decomposition (with L being a lower triangular matrix of matrix Q) on $H = WF^H = G^{-1}CF$. The decomposition is easily obtained applying the Gram-Schmidt orthogonalization procedure on the rows of H, where the resulting orthonormal vectors form the columns of F of dimension N×K with $F^H F = I_\kappa$. The Gram-Schmidt coefficients define the K×K lower triangular matrix W. The diagonal matrix $G = \mathrm{diag}(\omega_{1,1}^{-1}, \ldots, \omega_{K,K}^{-1})$ converts W into the monic lower triangular matrix C. In this way, and C-I are the feedforward and feedback filter matrices respectively, and the feedback matrix $A = G\overline{H}$ cancels the inter-symbol interference, as shown in FIG. 2. The κ-th diagonal element in G corresponds to the scalar gain applied at the κ-th user's receiver.

It is preferable that each user be provided with roughly the same bit error rate (BER) performance. It can be seen from equation (5) that the noise at each user's receiver is amplified by the corresponding diagonal element of $G = \mathrm{diag}(\omega_{1,1}^{-1}, \ldots, \omega_{K,K}^{-1})$ resulting in different SNR (hence BER) performance among users. Power loading can be employed to enforce the same performance across users. That is, the symbol vector b[i] is first multiplied by a diagonal matrix $I = \mathrm{diag}(\Delta_1, \ldots \Delta_\kappa)$ with $\Delta_\kappa^2$ denoting the power assigned to user κ. The modulo operation for each user then needs to take the loading value into account since the distance between the constellation points is scaled by it. Given the total transmit power $P_T$, the loading problem can be formulated as solving for $\Delta_1, \ldots, \Delta_\kappa$ such that $\Sigma_{\kappa=1}^K \Delta_\kappa^2 = P_T$, and $\Delta_\kappa^2 \omega_{\kappa,\kappa}^2 = \eta$, ∀κ.

The solution is $$\gamma_k^2 = \frac{w_{k,k}^{-2}}{\sum_{k=1}^K w_{k,k}^{-2}} P_T, \quad (10)$$

$k = 1, \ldots, K$, and $$\eta = \frac{P_T}{\sum_{k=1}^K w_{k,k}^{-2}}.$$

The transmitter/base station can broadcast the common constant value η to all receivers and then the receivers can adjust their respective $\omega_{\kappa,\kappa}$ to obtain the required $\Delta_\kappa$ value in the modulo operator. Therefore, the loading operation only requires the transmission of a constant value η common to all receivers. Note that different weighting factors can be included if different SNR performance levels are desired for different receivers.

It is interesting to note that when orthogonal spreading sequences are employed, i.e., when $S^T S = I_\kappa$, then we have $\omega_{\kappa,\kappa}^{(b)} \leq \omega_{\kappa,\kappa}^{(c)}$, for κ=1, ..., K, and therefore $\eta^{(b)} \leq \eta^{(c)}$, where the superscripts b and c denote bit-wise and chip-wise precoders, respectively. First, comparing equations (3) and (9) we have $H^{(b)} = H^{(c)} S$. Let $u_{\kappa+1}, \ldots, u_N$ be (N-K) orthonormal vectors in $v^\perp \triangleq R^N \setminus \mathrm{span}(S)$. Define the unitary matrix $S' = [s_1, \ldots, s_K, u_{\kappa+1}, \ldots, u_N] = [S, U]$ and let $$X = [H^{(b)}, H^{(c)} U] = H^{(c)} S'. \quad (11)$$

Since S' is a unitary transformation, the rows in X and $H^{(c)}$ maintain the norm and the angles. Therefore, if the K×(N-K) block matrix $H_c U$ has any non-zero row (i.e., the projection of the rows of $H_c$ onto span(U) is non-zero), the norm of the corresponding row in $H^{(b)}$ will be smaller than in $H^{(c)}$. Now consider the LQ factorization $H^{(c)} = W^{(c)} F^{(c)H}$, obtained using Gram-Schmidt on the rows of $H^{(c)}$, i.e., $\{h_\kappa^{(c)T}\}_{\kappa=1}^K$. Each value $\omega_{\kappa,\kappa}^{(c)}$ can be obtained as follows. Assume that at the κ-th step of the Gram-Schmidt algorithm the orthonormal vectors $f_1^{(c)}, \ldots, f_{\kappa-1}^{(c)}$ (i.e., first κ columns in $F^{(c)}$) have been obtained from $h_1^{(c)}, \ldots, h_{\kappa-1}^{(c)}$, and denote $U_{\kappa-1} = \mathrm{span}\{f_1^{(c)}, \ldots, f_{\kappa-1}^{(c)}\}$. Then, by simple inspection of the structure of the LQ factorization $\omega_{\kappa,\kappa}^{(c)}$ is the norm of $\tilde{f}_\kappa^{(c)} = \mathrm{proj}_{u_{\kappa-1}^\perp}\{h_\kappa^{(c)}\}$ where $U_{\kappa-1}^\perp = R^N \setminus U_{\kappa-1}$ and $f_\kappa^{(c)} = \tilde{f}_\kappa^{(c)} / \omega_{\kappa,\kappa}^{(c)}$. That is $$\omega_{\kappa,\kappa}^{(c)} = \|h_\kappa^{(c)} - \mathrm{proj}_{u_{\kappa-1}}\{h_\kappa^{(c)}\}\| = \|\tilde{f}_\kappa^{(c)}\|. \quad (12)$$

On the other hand, the diagonal elements of $W^{(b)}$ are similarly obtained from $[H^{(b)}, 0_{\kappa, N-\kappa}]$. Then, using equations (11) and (12) we obtain $$\omega_{\kappa,\kappa}^{(b)} = \omega_{\kappa,\kappa}^{(c)} - \|\mathrm{proj}_{v^\perp}\{\tilde{f}_\kappa^{(c)}\}\|, \quad (13)$$

and hence $\omega_{\kappa,\kappa}^{(b)} \leq \omega_{\kappa,\kappa}^{(c)}$. Note that when N=K and orthogonal spreading sequences are employed, S is unitary and $\omega_{\kappa,\kappa}^{(b)} = \omega_{\kappa,\kappa}^{(c)}$ for all κ, and hence $\eta^{(b)} = \eta^{(c)}$. On the other hand, when the spreading sequences S are non-orthogonal, it is not true that $\omega_{\kappa,\kappa}^{(b)} \leq \omega_{\kappa,\kappa}^{(c)}$. However, it can be conjectured that $\eta^{(b)} \leq \eta^{(c)}$ still holds.

It is possible to optimize the system BER performance by optimizing the diagonal elements of the matrix W such that the common SNR of all users η is maximized. Note that W is obtained from the LQ decomposition of H. The LQ decomposition is essentially the Gram-Schmidt orthogonalization of the rows of H. The κ-th diagonal element of W is the length of the projection of the κ-th row vector of H onto the orthogonal complement of the space spanned by the first ($\kappa-1$) row vectors already orthogonalized. Different ordering in the orthogonalization process results in different diagonal values of W, and hence different values of $\eta$. Let P be the set of the K! possible K×K row permutation matrices. Then for any P ∈ P, PH is a row-permuted version of H, which corresponds to a particular ordering of the K users in TH-precoding. Denote $\omega_{\kappa,\kappa}(P)$ as the $\kappa$-th diagonal element of W resulting from the LQ decomposition of PH. Then the optimal row permutation matrix is given by $$P_{opt} = \underset{P \in \mathcal{P}}{\arg\max} \frac{P_T}{\sum_{k=1}^{K} w_{k,k}^{-2}(P)} = \underset{P \in \mathcal{P}}{\arg\min} \sum_{k=1}^{K} w_{k,k}^{-2}(P). \quad (14)$$

With the optimal permutation $P_{opt}$, the following modifications are needed at the transmitter and receiver:
  Perform the LQ decomposition as $PH=WF^H$, or $H=P^TG^{-1}CF$;
  Apply GP at the receiver (i.e., apply the scalar gains according to the optimal order);
  The feedback matrix for removing the ISI becomes $A=GP\bar{H}$.

With these modifications, the cascade of operations becomes $$z[i] = \underbrace{GP}_{rx}\left(\underbrace{P^TG^{-1}CF^H}_{channel}\left(\underbrace{F}_{FF\,cancel,FB}\underbrace{C^{-1}}_{}\left(\Gamma b[i] - \underbrace{GP\bar{H}x[i-1]}_{cancel,ISI}\right)\right) + \underbrace{\bar{H}x[i-1]}_{ISI\,channel} + v[i]\right) \quad (15)$$

$$= \Gamma b[i] + GPv[i].$$

Note that the matrices G, F and C above are obtained from PH.

An exhaustive search solution to equation (14) is, in general, computationally prohibitive. Nevertheless, an approximate solution can be obtained using a suboptimal approach of lower computational complexity. Note that $\pi_{\kappa=1}^{K}\omega_{\kappa\kappa}^{2}$ is invariant to the permutation matrix P. This result is easily proved recalling that $PH=WF^H$, with orthonormal columns in F, then $$\det(HH^H)=\det(P^T)\det(W)\det(W^H)\det(P)=\pi_{\kappa=1}^{K}\omega_{\kappa,\kappa}^{2}. \quad (16)$$

Consider the simple situation where K=2 users. Then H contains two rows denoted by $h_1^T$ and $h_2^T$. Without loss of generality, assume that $\|h_2\| < \|h_1\|$. Next, to maximize the objective function in equation (14), it can be shown that one should start with $h_2^T$, i.e., start by orthogonalizing the row with minimum $\omega_{\kappa,\kappa}$. Recall that $\omega_{\kappa,\kappa}$ is the length of the projection of the $\kappa$-th row of H onto the orthogonal complement of the subspace spanned by the previous ($\kappa-1$) rows already orthogonalized. Then we need to show that $$\frac{1}{\|h_2\|^2} + \frac{1}{\left\|h_1 - \frac{h_2^H h_1}{\|h_1\|^2}h_2\right\|^2} < \frac{1}{\|h_1\|^2} + \frac{1}{\left\|h_2 - \frac{h_1^H h_2}{\|h_1\|^2}h_1\right\|^2}. \quad (17)$$

From equation (16), the products of the denominators on both sides in equation (17) are equal. Therefore, equation (17) is equivalent to $$\left\|h_1 - \frac{h_2^H h_1}{\|h_2\|^2}h_2\right\|^2 + \|h_2\|^2 < \left\|h_2 - \frac{h_1^H h_2}{\|h_1\|^2}h_1\right\|^2 + \|h_1\|^2 \Leftrightarrow \quad (18)$$

$$\frac{|h_2^H h_1|^2}{\|h_2\|^2} > \frac{|h_2^H h_1|^2}{\|h_1\|^2},$$

which is true by the assumption that $\|h_2\| < \|h_1\|$.

FIG. 3 sets forth pseudo-code illustrating a greedy approach to finding the optimal permutation matrix. As shown above, this approach is optimal for K=2 users. Although the approach is sub-optimal for more than two users, it obtains good results with low complexity and performs especially well when used with the chip-wise precoder when N>K. The approach illustrated by FIG. 3 proceeds by orthogonalizing the row with minimum $\omega_{\kappa,\kappa}$ at the $\kappa$th iteration. In other words, the row is selected that is the closest to the subspace spanned by the rows already chosen. In FIG. 3, $\mu_{p,j}=\tilde{h}_p^H h_j$ and $\theta_i$ represents the subset of rows already orthogonalized up to the i-th step. Note that besides finding the ordering P, the processing in FIG. 3 also provides the LQ decomposition $PH=WF^H$, since W is given by the GS coefficients $\mu_{i,j}$ and the i-th row of F is given by $\tilde{h}_i$. The complexity of the above search is $O(K^2)$, which is significantly lower than the $O(K!)$ complexity of the exhaustive search approach.

Assuming that loading is applied and $E\{|b_\kappa[i]|^2\}=1$, then the bit error probability of each user can be well approximated by $P_e=\alpha Q(\sqrt{\eta/\sigma_n^2})$, where $\alpha$ accounts for the increase in number of nearest neighbors due to the modulo operation (e.g., in QPSK $\alpha=2$). Note that the precoding operation enhances the transmit power by a factor of $$\beta = \frac{M}{M-1}.$$

When intersymbol interference is considered, previous symbols are always fedback and $\beta$ is well approximated by $$\frac{M}{M-1}.$$

Furthermore, because of the modulo operation, all of the symbols in the constellation have the same number of nearest neighbors and, therefore, the probability of error for the symbols at the edge of the constellation increases. This minor issue can be avoided—up to a point—by considering higher order constellations. As the constellation gets larger, $$\frac{M}{M-1} \to 1$$

and the percentage of symbols that increase the number of neighbors →0.

Figure 4:
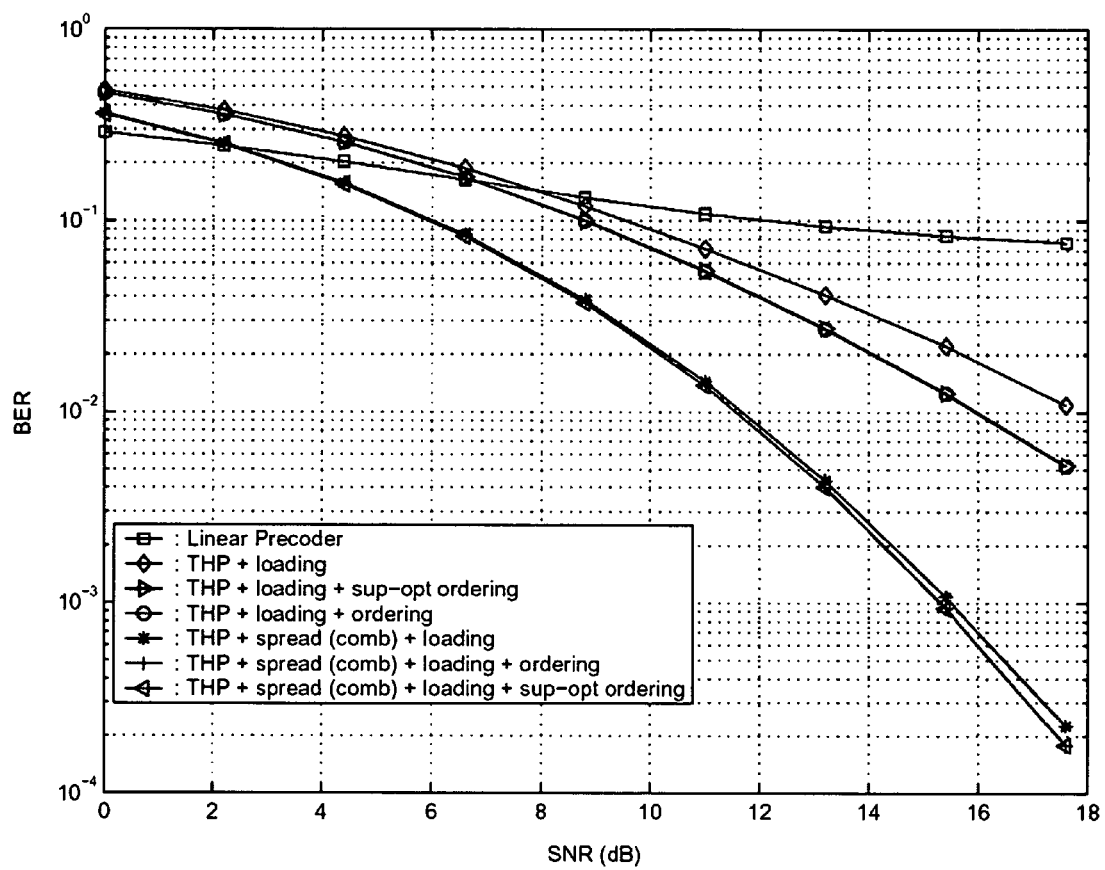
FIGS. 4, 5, and 6 illustrate the BER performance of the disclosed precoding techniques compared with a prior art linear precoder.
Figure 5:
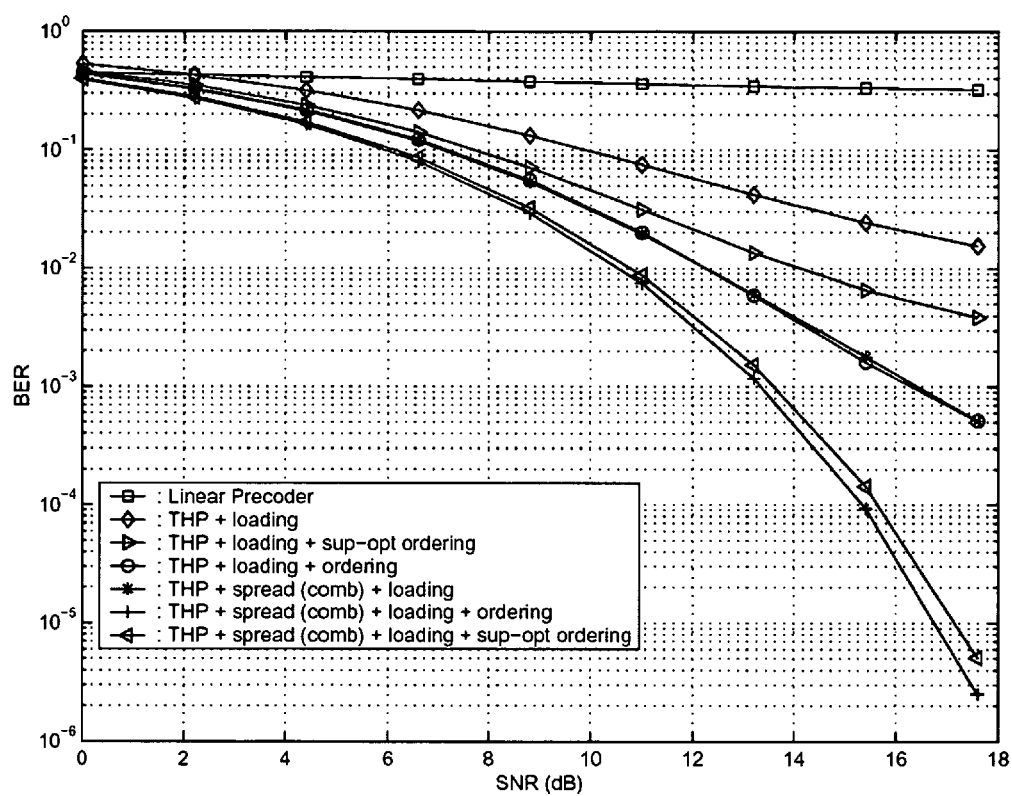
Figure 6:
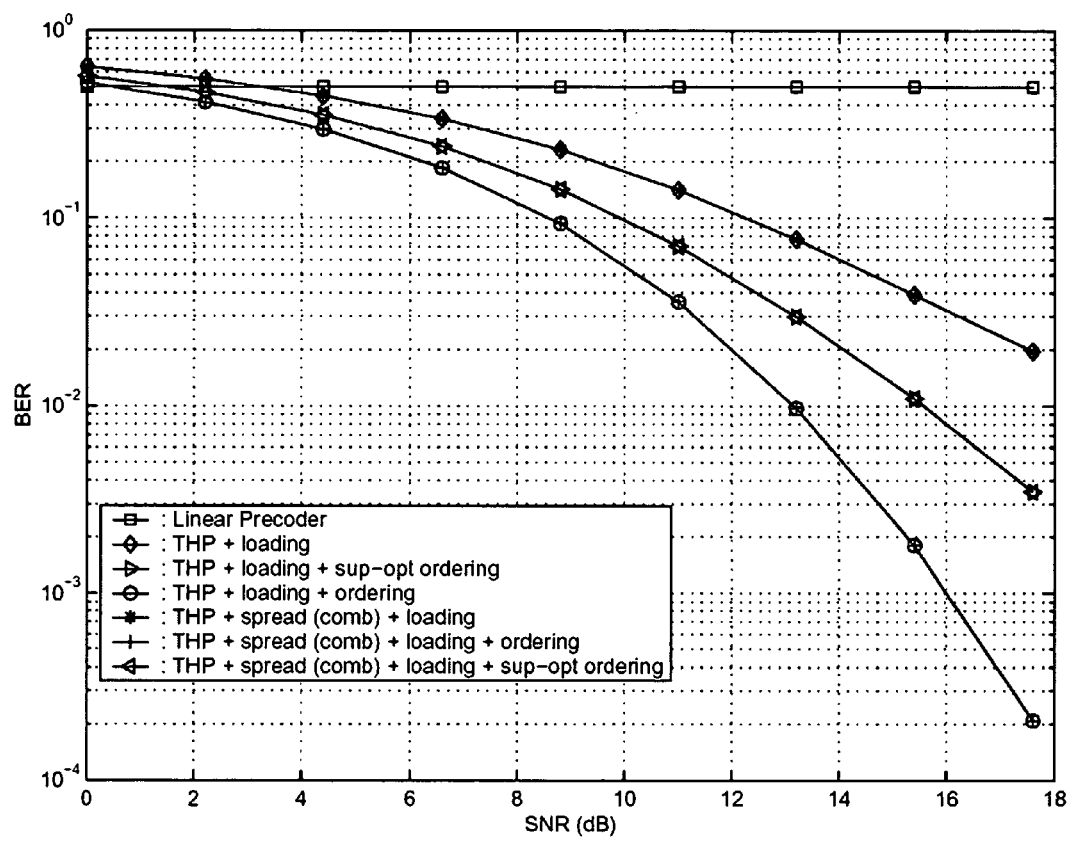

FIGS. 4, 5, and 6 illustrate the BER performance of the above nonlinear precoding techniques compared with a prior art linear precoder. Each receiver is assumed to employ a normalized Hadamard sequences of length N=8 as its spreading signature. All receivers are assumed to employ QPSK modulation. It is also assumed that each mobile user experiences an independent multipath channel $f_\kappa = [f_{\kappa,1}, \ldots, f_{\kappa,L}]^T$ with $L=3$ resolvable paths and the transmitter has perfect channel state information of all users. The path gains are generated according to $$f_{k,i} \sim \mathcal{N}_c\left(0, \frac{1}{L}\right).$$

For each data block, independent channel realizations are simulated for each user and the results are averaged over 1000 blocks. The continuous lines in the figures correspond to the analytical results computed using the approximate formula $P_e = \alpha Q(\sqrt{\eta/\sigma_n^2})$ while the marks correspond to the simulated results. The above-described loading technique is employed, and a comparison is made between different ordering approaches: no-ordering, optimal ordering (i.e., exhaustive search) and the suboptimal ordering approach illustrated by FIG. 3.

FIG. 4 shows the BER performance of the bit-wise precoder and the chip-wise precoder proposed above where the number of users is $K=3$. As shown in FIG. 4, both non-linear precoders significantly outperform the prior art linear precoder. Moreover, the chip-wise precoder appears to offer better performance than the bit-wise precoder. Ordering appears to have a significant effect on the bit-wise precoder, whereas it does not appear to make a notable difference to the chip-wise precoder (for small number of users K). Furthermore, the greedy ordering approach described above appears to provide performance close to that of an exhaustive search method. FIG. 5 shows how the performance is affected when the number of users is increased to $K=7$. Notably, FIG. 5 shows that both precoding schemes perform very well even in such highly loaded systems. When the number of users is high, ordering brings a significant improvement for both bit-wise and chip-wise precoders, although the complexity of the exhaustive search method becomes prohibitive (i.e., it involves computing $K! = 5040$ LQ decompositions of 7×7 matrices). The suboptimal ordering approach performs especially well in the chip-wise precoder and it requires less than 7 LQ decompositions. Comparing FIG. 5 with FIG. 4, it can be observed that the performance difference between the two precoders is reduced as the number of users increases.

FIG. 6 shows the performance of the different precoding approaches in an adverse scenario with a severe multipath channel with $L=7$ resolvable paths each distributed as $$\sim \mathcal{N}_c\left(0, \frac{1}{7}\right)$$

and with $K=N=8$ users. As shown in FIG. 6, the chip-wise precoder and the bit-wise precoder provide the same results and the curves completely overlap. The reason is that the matrix H has the same dimensions for both solutions since $N=K$. As before, when the number of users is large, ordering improves the performance considerably. Moreover, it is seen that the effect of severe multipath and a large number of users has a minimum effect on performance. Also, the heuristic ordering approach does not perform well when $N=K$.

It has been assumed above that the transmitter has knowledge of the multipath channel states of all the receivers. In wireless systems using time division duplex (TDD), the downlink channel state information is available at the transmitter (which is estimated from the uplink transmission) as long as the coherence time of the channel is larger than the time difference between the uplink and downlink slots. On the other hand, in fast fading channels, the channel state that has been estimated during an uplink slot may have changed, and the estimate may no longer be accurate for precoding in the next downlink slot. In this case, channel prediction techniques can be used to estimate the future downlink channel state from the current and previous uplink channel estimates, by exploiting the second-order statistics of the fading channel.

Assume that the complex Gaussian fading process of each channel path $f_{\kappa,i}(t)$ follows the Jakes' model with the maximum Doppler spread $f_d$. See, e.g., W. C. Jakes, "Microwave Mobile Communications," Wiley (1974). That is, we have $E\{f_{\kappa,i}(t_1)f_{\kappa,i}(t_2)\} = v_{\kappa,i}^2 J_0(2\pi f_d |t_1-t_2|)$, $\kappa=1, \ldots, K$; $i=1, \ldots, L$, where $J_0(\cdot)$ is the zeroth-order Bessel function of the first kind. Assume that in a TDD system the uplink and downlink slots are separated by T seconds; and the transmitter/base station estimates the multipath channel of each receiver every uplink slot. We set the time of the latest channel estimation as the reference $t=0$. Then the transmitter will estimate the channel state at times $t \in \{0, -2T, -4T, \ldots\}$. Consider channel estimation based on pilot symbols where the channel estimate has the form $\hat{f}_{\kappa,i}(t) = f_{\kappa,i}(t) + \xi_{\kappa,i}(t)$, where $\xi_{\kappa,i}(t) \sim N_c(0, \Delta_{\kappa,i}^2)$. It is assumed that the base station estimates the channel once per slot and these estimates will be used to predict the channel for data precoding in the next downlink slot. Assume that after the current channel estimate at time $t=0$ the base station predicts each channel path at time $\tau$ which is called the prediction depth (e.g., $\tau=T$ where T is the slot duration). The prediction is implemented using a P-th order finite impulse response (FIR) filter $$\tilde{f}_{k,i}(\tau) = \sum_{p=0}^{P} w_{k,i}(p) * \hat{f}_{k,i}(-p2T) = w_{k,i}^H \hat{f}_{k,i}, \quad (19)$$

where $\omega_{\kappa,i} \triangleq [\omega_{\kappa,i}(0), \omega_{\kappa,i}(1), \ldots, \omega_{\kappa,i}(P)]^T$, $\hat{f}_{\kappa,i} \triangleq \{\hat{f}_{\kappa,i}(0), \hat{f}_{\kappa,i}(-2T), \ldots, \hat{f}_{\kappa,i}(-P2T)\}^T$. The optimal filter that minimizes the mean square error $\zeta_{pred} \triangleq E\{|f_{\kappa,i}(\tau) - \tilde{f}_{\kappa,i}(\tau)|^2\}$ is given by $\omega_{\kappa,i} = R_{\kappa,i}^{-1} r_{\kappa,i}$, where the entries of $R_{\kappa,i}$ and $r_{\kappa,i}$ are given respectively by $[R_{\kappa,i}]_{p,q} = v_{\kappa,i}^2 J_0(2\pi f_d |p-q|2T) + \Delta_{\kappa,i}^2 \delta_{p,q}$, and $[r_{\kappa,i}]_p = v_{\kappa,i}^2 J_0(2\pi f_d (\tau+p2T))$, p, q=0, 1, ..., P.

In the prediction filter described above, estimates of the channel are used that have been sampled every 2T seconds. This sampling rate is in general much higher than the required minimum Nyquist sampling rate equal to twice the Doppler frequency $2f_d$. It has been shown that such oversampling could be unfavorable when the order of the filter P is fixed. Assume that the base station is able to estimate the channel every 2T seconds. Define the optimal sampling period as $\delta 2T$, where $\delta$ is a positive integer. Then for fixed values of the prediction depth, noise variance, Doppler frequency and filter order, we can compute the MSE of the prediction filter $\zeta_{pred}$ for different integer values of $\delta$ and select the one that minimizes $\zeta_{pred}$. On the other hand, it has been observed that when the system parameters are fixed, $\zeta_{pred}$ decreases with the order of the prediction filter P. However, after a certain filter order, $\zeta_{pred}$ saturates since the noise in the previous channel estimates dominates in the MSE of the prediction error. Therefore, it is convenient to evaluate the MSE expression for different values of P and choose the shortest one that gets $\zeta_{pred}$ close to the saturation level.

Figure 7:
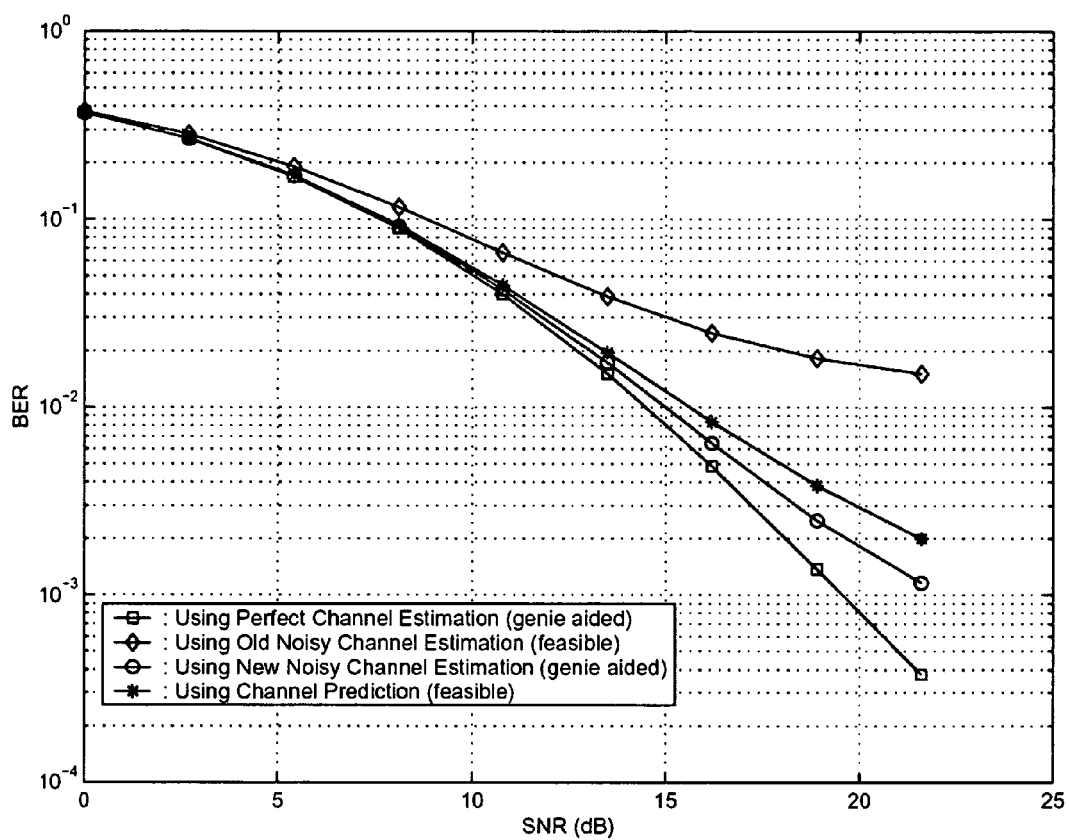
FIG. 7 illustrates the performance of channel prediction when used with the disclosed chip-wise precoding technique with loading and ordering.

FIG. 7 illustrates the performance of channel prediction when used with the above-described chip-wise precoding technique with loading and ordering. It is assumed that all the receivers are mobile units and are moving at v=36 Km/h. As in the WCDMA TDD mode, it is assumed that the uplink and downlink are time multiplexed into a carrier centered at $f_c=2$ GHz. The frame length is 10 ms, which is subdivided into 15 slots that can be allocated for either uplink or downlink. Therefore the uplink and downlink transmission can be interleaved in bursts of T=666.7 µs. As in the above description, we consider N=8, L=3 and $v_{\kappa,i}^2=1/L$. The fading process of each channel path is formed by samples of a stationary zero-mean complex Gaussian process with autocorrelation function $J_0(2\pi f_d t)$ and is generated according to the method described in P. Dent, et al., "Jakes Fading Model Revisited," IEEE Electonic Letters, 29(13), pp. 1162-63 (June 1993). The previous channel estimates $\{\hat{f}_{\kappa,i}(t), t=0, -2T, \ldots\}$ are given by the true channel values corrupted by complex Gaussian noise with variance $\Delta_{\kappa,i}^2=0.001$. Evaluating the MSE expression $\zeta_{pred}$ for different orders of the prediction filter we find that a very short prediction filter with P=2 obtains good results. Evaluating $\zeta_{pred}$ we find that slightly better results can be obtained if the channel is sampled with δ=2. The results are evaluated over 10 different initial channel realizations. For each channel realization, we consider 200 slots of length T=666 µs (i.e., 200 channel variations) and in each slot we send 1000 QPSK symbols per mobile user. In the results we consider perfect channel estimation (genie aided), old channel estimation τ seconds before, and channel prediction with the optimal sampling (δ=2) and with the regular sampling (δ=1). FIG. 7 shows that the above-described prediction technique gives very good results even considering that all the users are moving at v=36 Km/h and the prediction is based on noisy channel estimates. Notice that without channel prediction and only using old channel estimates, the performance would decrease considerably in these scenarios representing very high mobility.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for preprocessing a spread-spectrum transmission, the method comprising the steps of:
   receiving channel state information for multipath channels to K receivers, $K \geq 2$;
   precoding incoming K×1 symbol vectors prior to transmission by
       applying a first feedback filter to a previously-precoded vector, and subtracting from the incoming K×1 symbol vectors to cancel intersymbol interference, the first feedback filter generated using the channel state information; and
       applying a second feedback filter and a feedforward filter, the second feedback filter and the feedforward filter arranged so as to use the channel state information to cancel multiuser interference along the multipath channels to the K receivers.

2. The method of claim 1 wherein the preceding of a K×1 symbol vector proceeds in a bit-wise operation resulting in a K×1 precoded symbol vector and wherein the method further comprises applying a spreading operation to the K×1 precoded symbol vector thereby resulting in a precoded chip vector.

3. The method of claim 1 wherein precoding the incoming K×1 symbol vectors is combined with a spreading operation so that the precoding of a K×1 symbol vector proceeds in a chip-wise operation resulting in a N×1 precoded chip vector where N is a spreading factor for the spreading operation.

4. The method of claim 1 wherein a modulo operation is applied with the second feedback filter so as to prevent an increase in transmit power.

5. The method of claim 1 wherein channel state is represented by a matrix H which is decomposed into matrices $G^{-1}CF^H$, F being a unitary matrix, $G^{-1}C$ being lower triangular where G is a diagonal matrix which makes C monic lower triangular and where operation of the first feedback filter cancels intersymbol interference, operation of the second feedback filter can be represented by a feedback filter matrix (C-I), where I is an identity matrix, and operation of the feedforward filter can be represented by F.

6. The method of claim 5 wherein decomposition of the matrix H is performed using LQ decomposition, L being a lower triangular matrix of matrix Q.

7. The method of claim 5 wherein power loading is applied by multiplying the incoming K×1 symbol vectors by a matrix whose diagonal elements represent power assigned to a particular receiver.

8. The method of claim 7 wherein performance is optimized by orthogonalizing rows in the matrix H in an optimized order.

9. The method of claim 8 wherein the optimized order is specified by a permutation matrix P and wherein an optimal permutation matrix is found by iteratively selecting a row that is closest to a subspace spanned by rows already orthogonalized.

10. The method of claim 1 wherein the channel state information is estimated based on information from a previous transmission slot.

11. A transmitter arrangement for a spread-spectrum transmission system, the transmitter arrangement comprising:
   a channel state estimator for generating channel state information for multipath channels to K receivers, $K \geq 2$; and
   a precoder for preceding incoming K×1 symbol vectors prior to transmission, the precoder comprising
       a first feedback filter generated using the channel state information from the channel state estimator, the first feedback filter being applied to a previously-precoded vector which is then subtracted from the incoming K×1 symbol vectors to cancel intersymbol interference; and
       a second feedback filter and a feedforward filter, the second feedback filter and the feedforward filter arranged so as to use the channel state information to cancel multiuser interference along the multipath channels to the K receivers.

12. The transmitter arrangement of claim 11 wherein the precoding of a K×1 symbol vector proceeds in a bit-wise operation resulting in a K×1 precoded symbol vector and wherein the transmitter arrangement further comprises a module which performs a spreading operation to the K×1 precoded symbol vector thereby resulting in a precoded chip vector.

13. The transmitter arrangement of claim 11 wherein precoding the incoming K×1 symbol vectors is combined with a spreading operation so that the preceding of a K×1 symbol vector proceeds in a chip-wise operation resulting in a N×1 precoded chip vector where N is a spreading factor for the spreading operation.

14. The transmitter arrangement of claim 11 wherein a modulo operation is applied with the second feedback filter so as to prevent an increase in transmit power.

15. The transmitter arrangement of claim 11 wherein channel state is represented by a matrix H which is decomposed into matrices $G^{-1}CF^H$, F being a unitary matrix, $G^{-1}C$ being lower triangular where G is a diagonal matrix which makes C monic lower triangular and where operation of the first feedback filter cancels intersymbol interference, operation of the second feedback filter can be represented by a feedback filter matrix (C-I) where I is an identity matrix, and operation of the feedforward filter can be represented by F.

16. The transmitter arrangement of claim 15 wherein decomposition of the matrix H is performed using LQ decomposition, L being a lower triangular matrix of matrix Q.

17. The transmitter arrangement of claim 15 wherein power loading is applied by multiplying the incoming K×1 symbol vectors by a matrix whose diagonal elements represent power assigned to a particular receiver.

18. The transmitter arrangement of claim 17 wherein performance is optimized by orthogonalizing rows in the matrix H in an optimized order.

19. The transmitter arrangement of claim 18 wherein the optimized order is specified by a permutation matrix P and wherein an optimal permutation matrix is found by iteratively selecting a row that is closest to a subspace spanned by rows already orthogonalized.

20. The method of claim 11 wherein the channel state information is estimated by the channel state estimator based on information from a previous transmission slot.

\* \* \* \* \*